H. HARRIS.
REFINING OF LEAD.
APPLICATION FILED JAN. 29, 1920.

1,418,148.

Patented May 30, 1922.

Inventor.
Henry Harris
by
Attorney

UNITED STATES PATENT OFFICE.

HENRY HARRIS, OF LONDON, ENGLAND.

REFINING OF LEAD.

1,418,148.	Specification of Letters Patent.	Patented May 30, 1922.

Application filed January 29, 1920. Serial No. 354,852.

*To all whom it may concern:*

Be it known that I, HENRY HARRIS, a subject of the King of Great Britain, residing in London, England, have invented certain new and useful Improvements in the Refining of Lead, of which the following is a specification.

The refining of metals by causing them in molten condition to pass in thin streams through a molten reagent is known.

It is the object of this invention to provide a suitable apparatus for applying this mode of refining, whereby it is easy to treat the metal with the same reagent several times or with a fresh reagent.

The object is achieved by confining the molten reagent in a vertical cylinder open at both ends and sealed at its lower end by some of the refined molten metal. When the reagent has performed its function it may be allowed to solidify so that the cylinder can be removed and another put in its place to receive fresh reagent.

Figure 1:
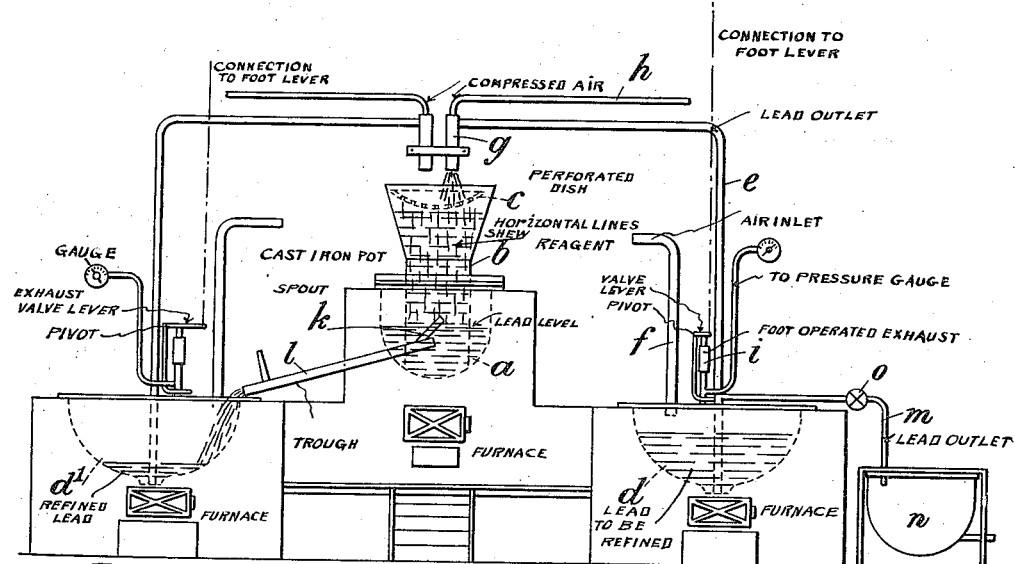
Figure 2:
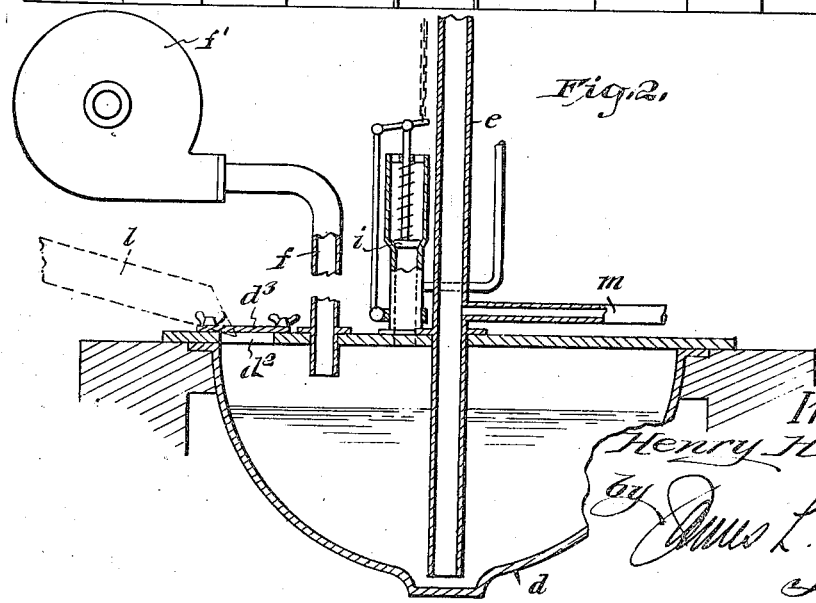

The accompanying drawings illustrate a plant embodying the invention, Fig. 1 being a diagram of the plant and Fig. 2 a vertical section drawn to an enlarged scale through one of the melting pots.

$a$ is a cast iron pot set in a furnace and containing lead. In this pot is set a cast iron cylinder $b$ splayed out at its upper part where it contains a suitably perforated dish $c$. Into this cylinder is introduced the reagent, for instance common salt, the melting point of which has been reduced by admixture of caustic soda (see my application for U. S. patent, Serial No. 354051). The heat of the furnace, conducted through the lead, may suffice to keep the reagent molten until it becomes nearly exhausted; if this heat is not sufficient the cylinder must be heated.

The lead to be refined is contained in a pot $d$ set in a furnace and covered substantially air-tight. Through the cover extends air-tight, a pipe $e$ terminating at the bottom of the pot and a pipe $f$ leading from a compressor $f'$ and terminating above the surface of the lead. The pipe $e$ ends above the dish $c$ in a short pipe $g$ of somewhat wider bore in the axis of which is a narrow pipe $h$.

A suitable exhaust valve $i$ having been closed, the pressure of a source of compressed air connected with pipe $f$ forces the lead up pipe $e$, and discharges it through pipe $g$ where it may be sprayed into dish $c$ by a jet of compressed air through pipe $h$. The metal falls in streams consisting of fine drops through the molten reagent in cylinder $b$, leaves pot $a$ by an overflow spout $k$ and is conducted into a suitable receptacle. In case a single treatment does not sufficiently refine the lead the said suitable receptacle may be, as here shown, a second melting pot $d'$ provided with pipes as already described with reference to pot $d$, so that when this pot $d'$ has received all the lead that was in pot $d$, this lead may be forced back through the reagent, the gutter $l$ being swung over to discharge the refined lead into pot $d$. Each of the pots $d$, $d'$ has on its cover an opening $d^2$ capable of being hermetically closed by a cover $d^3$ and opened when the pot is to act as receiver. When the lead has been refined the valve $i$ is sufficiently closed to permit the air pressure in pot $d$ to force the lead through pipe $m$, which communicates with the pipe $e$, into pot $n$, the valve $o$ having been opened; it being understood that during this operation the air pressure is so regulated that the lead does not rise high enough in the pipe $e$ to discharge into the dish $c$.

Having thus described the nature of the said invention and the best means I know of carrying the same into practical effect, I claim:—

1. An apparatus for refining metals, comprising a heated pot adapted to contain the molten metal, a vertical open-ended cylinder adapted to contain a molten reagent and having its lower end beneath the surface of the molten metal in the pot, a distributor at the upper part of the cylinder, and a device for charging the distributor with the molten metal.

2. An apparatus for refining metals, comprising a heated pot adapted to contain the molten metal, a vertical open-ended cylinder adapted to contain a molten reagent and having its lower end beneath the surface of the molten metal in the pot, a distributor at the upper part of the cylinder and an air spray adapted to charge the molten metal to the distributor while at the same time partially oxidizing the metal.

3. An apparatus for refining metals, comprising a heated pot adapted to contain the molten metal, a vertical open-ended cylinder adapted to contain a molten reagent and having its lower end beneath the surface of the molten metal in the pot, a distributor at the upper part of the cylinder, two melting pots at a lower level than the aforesaid pot, a device for raising the molten metal from each melting pot to the distributor and a device whereby the lead can be allowed to flow from the aforesaid pot to either melting pot, whereby the molten metal may be transferred from either melting pot to the other and may pass through the molten reagent on its way.

In testimony whereof I have signed my name to this specification.

HENRY HARRIS.